March 1, 1966   L. G. STRAUB ETAL   3,237,414
WAVE ATTENUATING DEVICE AND METHOD OF ATTENUATING WAVES
Filed Oct. 19, 1959

INVENTORS
LORENZ G. STRAUB
HARALD D. FREDERIKSEN
JOSEPH M. WETZEL
CHARLES E. BOWERS

By Moore, White & Burd
ATTORNEYS

United States Patent Office 3,237,414
Patented Mar. 1, 1966

3,237,414
WAVE ATTENUATING DEVICE AND METHOD OF ATTENUATING WAVES
Lorenz G. Straub, Minneapolis, Minn., Harald D. Frederiksen, Sacramento, Calif., and Joseph M. Wetzel, Brooklyn Center, and Charles E. Bowers, St. Paul, Minn., assignors to The Regents of the University of Minnesota, Minneapolis, Minn., a corporation of Minnesota
Filed Oct. 19, 1959, Ser. No. 847,353
6 Claims. (Cl. 61—5)

This invention relates to the attenuation of surface waves on oceans, lakes, seas, and like bodies of water. More particularly, this invention relates to a portable wave attenuating device adapted to be anchored to float at the surface of a body of water or like fluid subject to substantial wave motion, usually to protect some specified area or object from wave damage. The device of this invention is positioned so as to dissipate the force of the waves.

Various means of dissipating surface waves are known. These include rubble-mound breakwaters, pneumatic breakwaters formed by a rising current of air, hydraulic breakwaters utilizing horizontal jets of water to break up waves or rigid-type floating breakwaters. These breakwater means are subject to numerous limitations and disadvantages and most have only a limited special area of application. Rubble-mound breakwaters are expensive and not portable. Hydraulic and pneumatic breakwater systems are portable but require considerable power and are not particularly effective for $L/d$ (ration of wave length to depth of base liquid) values in excess of 2. The rigid-type floating breakwater is expensive, difficult to assemble and vulnerable to destruction by large waves.

It is the principal object of this invention to provide a portable flexible breakwater comprising a flexible bag filled with a fluid having either a viscosity equal or higher than the base fluid or a density equal or lower than the base fluid on which the waves are to be dissipated which is effective for $L/d$ values of up to 8 or more.

Other objects of the invention will become apparent as the description proceeds.

To the accomplishment of the foregoing and related ends, this invention then comprises the features hereinafter fully described and particuarly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which.

Figure 1:
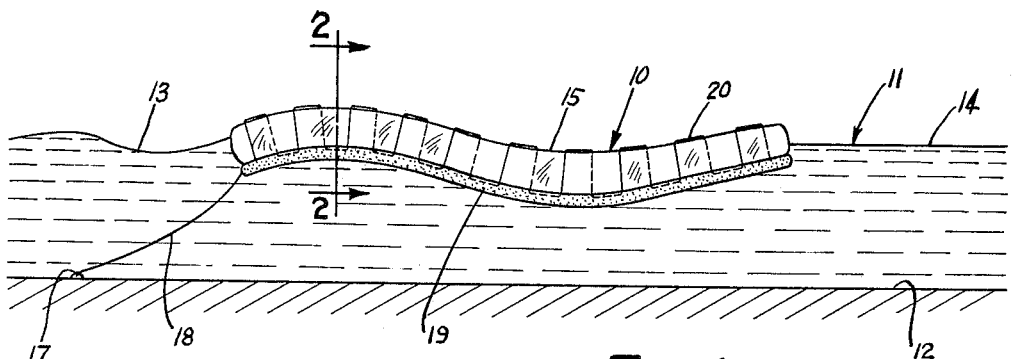
FIGURE 1 is a vertical section through a body of water whose surface is subject to wave motion and showing one form of wave attenuating device according to this invention anchored in place so as to float at (i.e., on or near) the surface of the body of water.
Figure 2:
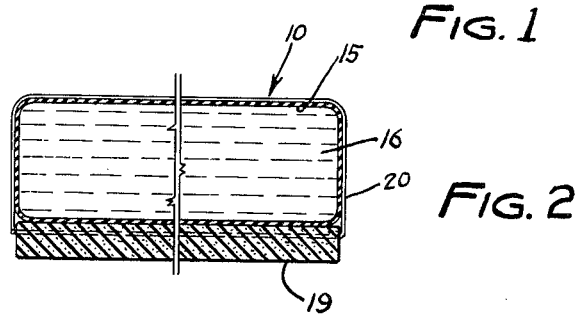
FIGURE 2 is a transverse vertical section through the wave attenuating device shown in FIGURE 1 taken generally on the line 2—2 of FIGURE 1 and in the direction of the arrows.

Referring to the drawings, and particularly to FIGURES 1 and 2, there is shown one form of portable flexible wave attenuating device according to the present invention. The wave attenuating device or "blanket" is indicated generally at 10 floating at the surface of a body of water, indicated generally at 11, having a bed 12. The sectional view shown on FIGURE 1 is along a line extending from the shore (which would be in the direction of the right hand edge of the sheet) outwardly into the body of water. The seaward side of the water's surface, indicated at 13, is wavy and choppy. The landward side of the surface of the water, indicated at 14, is relatively smooth and calm as a result of the wave attenuating action of the blanket 10.

The wave attenuating blanket 10 consists of one or more flexible bags 15 filled with a fluid 16 having either viscosity equal to or higher than the base fluid or density equal to or lower than the base fluid on which the waves are to be attenuated. In most instances the base fluid will be water. In some instances the fluid 16 contained within the flexible bags may have both a higher viscosity and a lower density than water. The bags are of substantial length relative to their thickness. The thickness and length of the wave attenuating blankets are related to the height and wave length of the waves against which protection is afforded. In general, it may be stated that the waves against which protection may be afforded to specified areas or objects may have wave lengths varying between about 400 and 600 feet and such waves may range in height up to about 15 to 20 feet. Desirably, the wave attenuating blanket is at least from about ½ to 1 times as long as the wave length and preferably is between about 0.65 to about 0.85 times the wave length.

The thickness of the blanket is preferably from about 0.25 to 0.75 times the height of the wave and preferably between about 0.4 and 0.6 times the height of the wave. Thus, in general, the bags may range in length from at least ten times to as much as 150 times the thickness of the bags or, more generally, the length may be about 20 to 50 times the thickness. Consider, for example, conditions in which a blanket 10 feet thick and 450 feet long is used in an area of waves 600 feet long and 20 feet high. The blanket is 0.75 times the wave length and 0.5 times the wave thickness; or consider conditions in which a blanket 300 feet long and 7½ feet thick is used to attenuate waves having a length of 400 feet and a thickness of 15 feet. The blanket is 0.75 times the wave length and 0.5 times the wave thickness.

Since, in virtually all circumstances, the wave attenuating blanket will have been constructed in anticipation of expected wave conditions, it will be obvious that wide variations will be possible and likely depending upon natural wave conditions actually encountered at a particular place and time. Where wave attenuating blankets are designed for use in the protection of a particular fixed site, it can, of course, be constructed so as to be effective against the worst expected wave conditions as determined by observation and experience.

The wave attenuating blanket may be as wide as needed. A relavtively narrow width of blankets may be needed to protect the mouth of a harbor or sheltered bay whereas a flexible breakwater of substantial length would be necessary to protect an open exposed beach. In either instance the breakwater may be formed from a plurality of separate closely adjacent blankets floating independently or from a plurality of blankets together. The bags float at the surface of the water, that is, on or near the water surface. The devices may be anchored to be positioned any depth within ½ wave length of the surface of the water. The flexibile bags are disposed on or near the surface of the water with their longitudinal axes at approximately right angles to the incident wave crests. One or more anchors 17, connected to the bags by lines 18 of appropriate length, are employed to maintain the horizontal position of the wave attenuating blanket. When the bags 15 are filled with a high viscosity fluid, the density of the filled bag may be about the same as, or greater than, then density of the base fluid.

When this condition exists, it is necessary that some auxiliary buoyant device, such as pad or mat 19, be employed. The pad or mat 19 is a flexible buoyant material, such as an air mattress, foam rubber or foam plastic material, segments of cork or lightweight wood (such as balsa wood), secured together into a flexible platform, or the like.

The bags 15 are preferably of cellular construction so as to avoid "ballooning" of the bag caused by localized concentration of a large volume of fluid under influence of the wave motion. In some instances, to avoid ballooning, it is desirable to provide external constraining means around the flexible bag. This may be in the form of a net or cage of strong cord or rope, cable, wire and the like. An exemplary form of spiral wire cage is shown in FIGURES 1 and 2. A flexible wire cable 20 is secured at one end of the pad 19. It is then passed over and around the bag 15, threaded through the pad 19, once again over and around the bag and so on in a spiral pattern until the free end is secured to the pad at the opposite end of the blanket. It will be appreciated that such constraining means are less necessary when some inherent constraint is built into the flexible bag as, for example, where cellular bags are employed.

Figure 3:
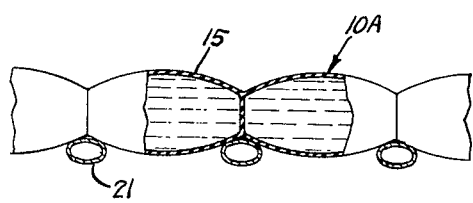
FIGURES 3, 4 and 5 are end views in partial transverse vertical cross-section showing typical cross-section of modified forms of wave attenuating devices composed of cellular flexible containers.
Figure 4:
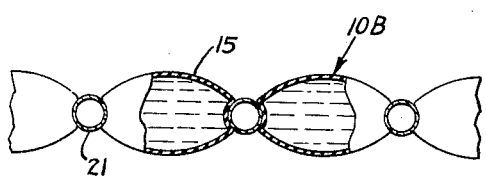
Figure 5:
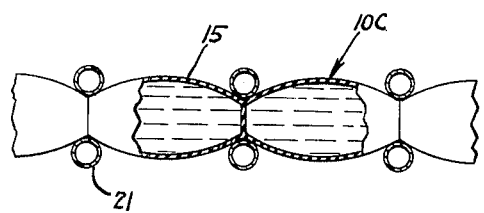

In FIGURES 3, 4 and 5 there are shown typical cross sections of three different cellular bags employing air to supply additional buoyancy. In FIGURE 3, there is shown a modified form of wave attenuating blanket 10A comprised of a plurality of adjacent flexible bags disposed side by side and secured together and having a plurality of elongated longitudinal air cells 21 underlying the bags 15 at their point of juncture with one another to provide buoyant support for the bags. In FIGURE 4, there is shown a further modified form of wave attenuating blanket 10B comprised of a plurality of flexible bags 15 each being connected to an adjacent elongated longitudinal air cell 21 which in turn is connected to another flexible bag for containing high viscosity or low density fluid. In FIGURE 5, there is shown a still further modified form of wave attenuating blanket 10C which is similar in construction to that of FIGURE 3 with the exception that additional air cells 21 are provided along the top surface of the blanket to provide additional buoyant support.

When the blankets are floating on or near the surface of the base fluid, incident waves induce a corresponding wave in the blanket and in the bags comprising the blanket. The blankets are disposed with their longitudinal axes approximately at right angles to the crests of the incident waves. When the flexible bags contain a fluid of high viscosity, attenuation of the wave results from (a) energy loss in the fluid within the bags, (b) reflection of part of the incident waves, (c) partial cancellation of the incident wave by creation of disturbances out of phase with the incident wave, and (d) friction between the base fluid and the lower surface of the bag. When the flexible bags contain a fluid having a much lower density than the base fluid, attenuation of the wave similarly results except that partial cancellation of the incident wave by creation of out-of-phase disturbances is of greater importance than where the two densities are closer together. Where fluids of about equal densities and equal viscosities as the base fluid are used, intertial effects associated with the fluid confined in the bag are of primary importance. The constraining means, either in the form of a net or cage surrounding the blanket or in the cellular construction of the bags, insures retention of the form of the bag and uniform distribution of the fluid along the axis of the bags and cells.

In a test of the wave attenuating device of this invention in a test channel with incident waves 200 units long and 12 units high in water depth of 80 units, attenuation was close to 100% using an unrestrained flexible rubber bag containing high viscosity fluid (Methocel in water). The bag was supported on a foam rubber pad. The blanket was of substantially the same width as the test channel. It had an overall length of about 550 units and an overall thickness at rest of about 8 units. In another test of the same device with waves 400 units long and 21 units high, attenuation was 83%.

Similar tests were made utilizing a wave attenuating blanket comprising a rubber bag containing high viscosity fluid supported on a foam rubber pad and provided with a spiral wire restraining cage. Incident waves having a length of 200 units were attenuated on the order of 100%. The same device disposed in a test channel with incident waves 400 units long resulted in attenuation of about 90%. The general result is shown pictorially in FIGURE 1. The choppy or wavy surface of the base fluid on the seaward or left hand side of the view as shown at 13 induces waves in the blanket 10 largely dissipating the wave energy with the result that the surface of the basefluid on the landward or right hand side of the view is relatively smooth and calm as shown at 14.

The flexible bags and cells comprising part of the wave attenuating blanket of this invention may be formed from natural and synthetic rubbers and rubber-like synthetic resinous materials, rubberized and plastic-coated fabrics and the like. The bags or cells must be flexible, strong, impermeable to the passage of the contained fluid and compatible with the fluid. Thus, for example, where gasoline or fuel oil might be used as the wave attenuating fluid, synthetic rubber materials composed of butadiene-acrylonitrile copolymers and isobutylene-isoprene copolymers which are resistant to gasoline and oil may be used. The bags or cells should desirably be lightweight to make them more readily portable.

The fluid contained within the bags is preferably either a high viscosity fluid or a low density fluid, although fluids having the same viscosity and/or the same density as the base fluid may be used with good effect. Typical high viscosity fluids which can be easily prepared when needed are a mixture of water and methyl cellulose (Methocel); a mixture of water and wood pulp or other finely divided fibrous material; a mixture of water and glycerine; water and oil emulsions; suspensions of starch in water; high viscosity oils, such as fuel oils; and the like. Various thickening agent additives may be included to increase viscosity. Such materials include sodium carboxy-methyl cellulose, algin derivatives, polyoxyalkylene glycols, pectins, natural gums, gelatin and the like. Typical low density fluids include liquids such as gasoline and low density oils. Some materials, such as oils, may possess both characteristics of high viscosity and low density as compared with the base fluid which, in most instances, would be water. It will be understood that when the density of the fluid in the bags is about equal to that of the base fluid it will be necessary to impart buoyancy to the bags by means of air cells, foam pads, etc.

The wave attentuating blankets are preferably utilized in groups spaced from the particular area or object desired to be protected from wave damage or interference. Typical applications of use of the wave attenuating system include the protection of loading facilities, such as docks and the like; recreational beaches; harbors; marinas; off-shore drilling platforms; and the like. The wave attenuating blankets are portable so that they may be transported to the required location and placed in operation in a relatively short time. They require no source of power such as is needed for pneumatic and hydraulic breakwaters. The flexible blankets are easier to install and less likely to be subject to damage by excessively high waves than rigid-type floating breakwaters. When the need for a particular wave attenuating system has passed, the blankets may be retrieved and reused elsewhere.

It is apparent that many modifications and variations of this invention as hereinbefore set forth may be made without departing from the spirit and scope thereof. The specific embodiments described are given by way of example only and the invention is limited only by the terms of the appended claims.

We claim:
1. A device intended for the attenuation of surface wave in a rough body of water wherein the ratio of wave length to depth of water ($L/d$) exceeds 2 and in which the anticipated magnitude of the waves is so great as to be objectionable, which device comprises
   (A) a plurality of elongated uni-cellular flexible-walled containers,
   (B) said containers intended to be floated in adjacent side-by-side relationship at the surface of said body of water,
   (C) said containers provided with means for being anchored to extend substantially perpendicular to the incident wave crests of said body of water,
   (D) each of said containers being substantially filled with a liquid selected from the class of
      (1) liquids whose viscosity is not less than that of said body of water and
      (2) liquids whose density is not greater than that of said body of water,
   (E) each of said containers being from about 10 to 150 times longer than its thickness,
      (1) said length being from at least 0.5 to about 1 times the anticipated average wave length of waves to be attenuated in said body of water, and
      (2) said thickness being from about 0.25 to about 0.75 times the anticipated average height of waves to be attenuated in said body of water,
   (F) the interior of each of said elongated containers being relatively free of internal obstructions whereby the liquid within the containers may move freely along the lengths of the containers in response to wave action.

2. A device according to claim 1 further characterized in that said flexible walled containers are at least partially surrounded by restraining means to maintain said form of the containers.

3. A device according to claim 1 further characterized in that the flexible walled containers are at least partially supported by auxiliary buoyant means secured adjacent thereto.

4. A method of attenuating surface waves in a rough body of water wherein the ratio of wave length to depth of water ($L/d$) exceeds 2 and in which the anticipated magnitude of the waves is so great as to be objectionable, which method comprises
   (A) disposing a plurality of elongated uni-cellular flexible walled containers
      (1) at the surface of said body of water
      (2) in the path of said waves,
   (B) floating said containers as a blanket in adjacent side-by-side relationship,
   (C) anchoring said containers to lie substantially perpendicular to the incident wave crests,
   (D) substantially filling each of said containers with a liquid selected from the class of
      (1) liquids whose viscosity is not less than that of said body of water, and
      (2) liquids whose density is not greater than that of said body of water,
         (a) said liquid being freely moveable within the containers along the lengths thereof in response to wave action.

5. A method according to claim 4 further characterized in that each of said flexible walled containers has a length from at least about 0.5 to about 1 times the anticipated average wave length and a thickness from about 0.25 to about 0.75 times the anticipated average height of the waves to be attenuated.

6. A method according to claim 4 further characterized in that said flexible-walled containers are floated within ½ wave length of the surface of the body of water.

References Cited by the Examiner

UNITED STATES PATENTS

| | | | |
|---|---|---|---|
| 436,644 | 9/1890 | White | 61—5 |
| 1,004,718 | 10/1911 | Wieland | 61—5 |
| 1,933,597 | 11/1933 | McVitty | 114—43.5 |
| 2,342,773 | 2/1944 | Wellman | 114—43.5 |
| 2,388,171 | 10/1945 | McVitty | 114—43.5 |
| 2,391,926 | 1/1946 | Scott. | |
| 2,682,151 | 6/1954 | Simpson | 61—1 |
| 2,850,252 | 9/1958 | Ford. | |
| 2,896,564 | 7/1959 | Wright | 114—43.5 |
| 2,886,951 | 5/1959 | Valembois. | |
| 2,920,846 | 1/1960 | Lingafelter. | |
| 2,945,465 | 7/1960 | Barton | 114—0.5 |
| 2,968,928 | 1/1961 | Wicklander | 61—1 |
| 3,022,632 | 2/1962 | Parks | 61—5 |
| 3,029,606 | 4/1962 | Olsen | 61—5 |
| 3,067,712 | 12/1962 | Doerpinghaus | 114—74.1 |

FOREIGN PATENTS

| | | |
|---|---|---|
| 536,798 | 4/1955 | Belgium. |
| 413,267 | 6/1947 | Italy. |

EARL J. WITMER, *Primary Examiner.*

WILLIAM I. MUSHAKE, JACOB L. NACKENOFF,
*Examiners.*